(12) United States Patent
Varillon

(10) Patent No.: US 8,508,656 B2
(45) Date of Patent: Aug. 13, 2013

(54) CONTROL OF A DYNAMIC IMAGE SENSOR

(75) Inventor: Paul Varillon, Grenoble (FR)

(73) Assignee: STMicroelectronics (Grenoble2) SAS, Grenoble (FR)

( * ) Notice: Subject to any disclaimer, the term of this patent is extended or adjusted under 35 U.S.C. 154(b) by 363 days.

(21) Appl. No.: 12/960,273

(22) Filed: Dec. 3, 2010

(65) Prior Publication Data

US 2011/0141311 A1 Jun. 16, 2011

(30) Foreign Application Priority Data

Dec. 16, 2009 (FR) ...................... 09 59034

(51) Int. Cl.
- *H04N 5/235* (2006.01)
- *H04N 5/238* (2006.01)
- *G03B 7/00* (2006.01)

(52) U.S. Cl.
USPC ............... 348/364; 348/229.1; 348/230.1; 348/362

(58) Field of Classification Search
None
See application file for complete search history.

(56) References Cited

U.S. PATENT DOCUMENTS

| | | | |
|---|---|---|---|
| 6,600,471 B2 * | 7/2003 | Lee et al. | 348/E3.018 |
| 7,202,892 B1 | 4/2007 | Ogata et al. | |
| 7,619,674 B2 * | 11/2009 | Han et al. | 348/308 |
| 8,063,963 B2 * | 11/2011 | Dierickx | 348/308 |
| 2001/0008419 A1 * | 7/2001 | Sano et al. | 348/222 |
| 2005/0012838 A1 * | 1/2005 | Kusuda | 348/308 |
| 2005/0052554 A1 * | 3/2005 | Sakurai et al. | 348/301 |
| 2008/0284872 A1 * | 11/2008 | Asoma | 348/229.1 |
| 2009/0027532 A1 | 1/2009 | Deschamps | |
| 2009/0316018 A1 | 12/2009 | Umeda | |

FOREIGN PATENT DOCUMENTS

WO WO 2004/064386 A1 7/2004

OTHER PUBLICATIONS

French Search Report dated Jul. 28, 2010 from corresponding French Application No. 09/59034.

* cited by examiner

*Primary Examiner* — Sinh Tran
*Assistant Examiner* — Jason Flohre
(74) *Attorney, Agent, or Firm* — Wolf, Greenfield & Sacks, P.C.

(57) ABSTRACT

A method and a circuit for controlling a dynamic image sensor defining, for each image, several successive time intervals of exposure of photodiode cells, starting from successive decreasing reset levels, wherein the time intervals of exposure of the image respect a homogeneous distribution of the amount of cells in ranges of brightness levels.

17 Claims, 4 Drawing Sheets

CONTROL OF A DYNAMIC IMAGE SENSOR

CROSS REFERENCE TO RELATED APPLICATIONS

This application claims the priority benefit of French patent application Ser. No. 09/59034, filed on Dec. 16, 2009, entitled "Control of a Dynamic Image Sensor," which is hereby incorporated by reference to the maximum extent allowable by law.

BACKGROUND OF THE INVENTION

1. Field of the Invention

The present invention generally relates to dynamic image sensors used in digital image acquisition devices such as cameras.

The present invention relates to such image acquisition devices, whether they are autonomous or part of a device comprising other functions such as, for example, a cell phone or an automobile vehicle.

2. Discussion of the Related Art

FIG. 1 very schematically shows, in the form of blocks, an example of an image acquisition device of the type to which the present invention applies. This device comprises an image sensor formed of photodiode cells and its control systems 10 (PIXEL ARRAY AND DRIVERS) providing the levels representative of the illumination of the different photodiodes. The image acquisition device also comprises a unit 11 for controlling sensor 10, comprised, among others, of an analog-to-digital signal converter 12 (ADC) and of a control and processing electronic circuit 14 (SE). The illumination levels are then exploited by a storage system 16 (MEM).

FIG. 2 shows an example of an equivalent electric diagram of a photodiode cell of an image sensor. The cell comprises a photodiode PD used in reverse mode and having its junction capacitance discharged by the photocurrent according to the received light intensity. The anode of photodiode PD is connected to a reference voltage (for example, ground M) and its cathode is connected to a node Q defining a reading point of the cell. Node Q is connected, by a switch RST, to a terminal 20 for providing a voltage $V_{RST}$, which is positive with respect to reference voltage M. Voltage $V_{RST}$ enables to reset the cell (precharge the junction capacitance of the photodiode) between two successive image acquisitions. Node Q is further connected by a switch SEL to a device MES for measuring the discharge voltage of photodiode PD. The output of the measurement device is connected to a terminal V which provides a voltage transmitted to block 12.

In a simple so-called static sensor, the acquisition is performed during a fixed integration period. If the light intensity fully discharges a photodiode before the end of the integration period, the cell is saturated. The sensor is no longer capable of distinguishing between the highest brightness levels or ranges of the cells.

In a so-called highly dynamic sensor, this saturation is desired to be avoided by the dividing of the integration period into time intervals between which read node Q is recharged.

FIG. 3 illustrates, in a timing diagram, the operation of a dynamic image sensor. This timing diagram shows four courses of voltage V originating from a photodiode for four different luminosities during an integrated period $T_{ON}$.

This timing diagram shows that for a 5-lux illumination, the final level read at the end of the integration periods is not altered by the successive resets. The 50-lux voltage is altered by the first reset, but not by the next two following ones. The 250-lux level is altered by the first and second resets, but not by the third one. The 500-lux level is altered for all resets. For this high brightness level, the cell saturates despite the performed resets.

In this example, the integration period is divided into 4 intervals $T_{INT1}$, $T_{INT2}$, $T_{INT3}$, and $T_{INT4}$ between which the sensor is reset to successive decreasing voltage levels $V_{RST1}$, $V_{RST2}$, $V_{RST3}$, and $V_{RST4}$.

At the beginning of period $T_{INT1}$, all photodiodes are precharged to voltage $V_{RST1}$. The photodiodes are then discharged during the entire period $T_{INT1}$. This first period avoids the saturation, but this saturation would be reached for period $T_{ON}$ for certain brightness levels.

At the beginning of periods $T_{INT2}$ and $T_{INT3}$, all photodiodes are precharged to voltage $V_{RST2}$, respectively $V_{RST3}$. As for the first period, the saturation is avoided. The last period $T_{INT4}$ does not avoid the saturation of higher levels. But photodiodes exposed to a high brightness, for example, 500 lux, are saturated and the data relative to the distribution of the saturated photodiode levels are lost.

In a usual dynamic sensor, the number of integration periods is adapted to avoid this saturation phenomenon. Conversely, if the image becomes darker, the number of intervals is decreased to improve the contrast of dark images.

Ideally, a homogeneous distribution of the cells in the entire excursion of the signal provided by the sensor (stored values or voltage levels) guarantees a good contrast. In practice, such a distribution is not achieved in a usual dynamic sensor. This phenomenon is illustrated by the right-hand portion of FIG. 3, which shows the cell distribution by brightness levels, assuming a sensor of 4xQ cells. It should be noted that quantities Q are not regularly distributed with respect to the brightness levels. Quantity αxQ represents the number of saturated cells.

Known examples of image sensors and their operation are described in U.S. Pat. Nos. 6,600,471 and 6,348,681.

SUMMARY OF THE INVENTION

An object of an embodiment of the present invention is to provide an image sensor overcoming all or part of the disadvantages of usual sensors.

Another object of an embodiment of the present invention is to provide a method for controlling a sensor which improves the quality and the contrast of the images.

To achieve all or part of these objects, as well as others, an embodiment of the present invention provides a method for controlling a dynamic image sensor comprising photodiode cells, each providing an information representative of a brightness level, comprising for each image the steps of: defining ranges of brightness levels; defining several successive time intervals of exposure of the cells, the cells being reset at the beginning of each interval and the reset levels being decreasing; and adapting the time intervals of exposure as a function of a homogeneous distribution of the number of cells in the ranges of brightness levels.

According to an embodiment of the present invention, the time intervals of exposure of a present image are used to determine those of a next image.

According to an embodiment of the present invention, the time intervals of exposure of the next image are calculated from the brightness levels of the current image and from the desired cell distribution for the next image.

According to an embodiment of the present invention, the time intervals $T_{(i)}$ between resets for the next image are calculated by means of the following formula:

$$T_{(i)} = \frac{PvalN+1_{(i)} - PvalN+1_{(i-1)}}{Sen \cdot (LvalN+1_{(i)} - LvalN+1_{(i-1)})},$$

where $PvalN+1_{(i)}$ designates the upper threshold of interval i for the next image, $PvalN+1_{(i-1)}$ designates the upper threshold of interval i−1 for the next image, $LvalN+1_{(i)}$ designates the brightness value of interval i for the next image, $LvalN+1_{(i-1)}$ designates the brightness value of interval i−1 for the next image, and Sen designates the sensitivity of a cell.

According to an embodiment of the present invention, the cell reset levels are calculated from the upper thresholds of the brightness intervals, the time intervals, the brightness values, and the sensitivity of a cell.

According to an embodiment of the present invention, levels $Prst_{(i)}$ of the successive resets for the next image are calculated by means of formula:

$$Prst_{(i)} = PvalN+1_{(i)} - (T_{(i)} \cdot Sen \cdot LvalN+1_{(i)}), \text{ where}$$

$T_{(i)}$ designates the exposure time interval of rank i between resets for the current image.

According to an embodiment of the present invention, a verification step ascertains that the successive reset levels are decreasing.

According to an embodiment of the present invention, a maximum brightness value of the cells of the current image is, optionally, compared with a threshold and adjusted, for the next image, to provide the cell distribution over the entire range of available values.

The present invention also provides a circuit for controlling an image sensor capable of implementing the method.

The present invention also provides an image sensor comprising a circuit for controlling an image sensor capable of implementing the method.

The foregoing objects, features, and advantages of the present invention will be discussed in detail in the following non-limiting description of specific embodiments in connection with the accompanying drawings.

DETAILED DESCRIPTION

Figure 1:
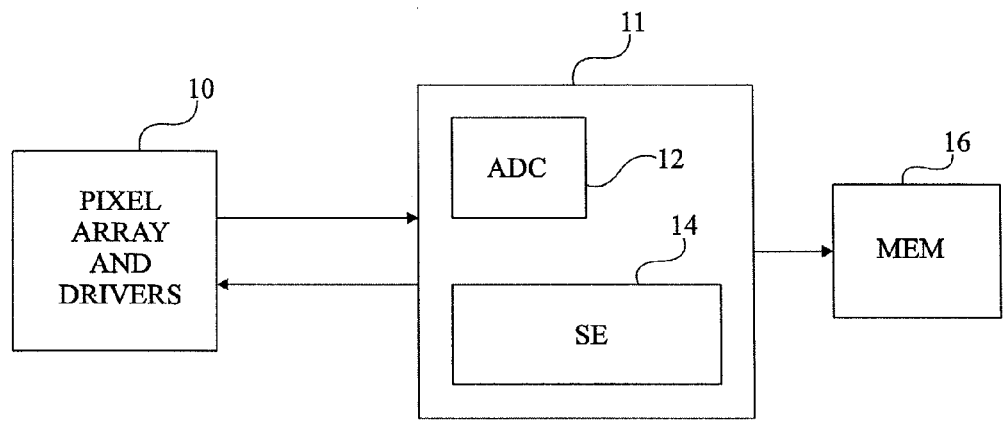
FIG. 1, previously described, very schematically shows in the form of blocks an example of an image acquisition device of the type to which the present invention applies.

The same elements have been designated with the same reference numerals in the different drawings, which have been drawn out of scale. For clarity, only those steps and elements which are useful to the understanding of the present invention have been shown and will be described. In particular, the generation of the control signals of an image sensor has not been detailed, the implementation of the present invention being compatible with conventional synchronization systems generating synchronization time signals. The destination of the signals originating from the image sensor has not been detailed either, the present invention being here again compatible with any conventional exploitation of such signals.

The present invention will be described in relation with an embodiment applied to monochrome photodiode cells. The present invention and the diagrams are, however, applicable to the processing of data provided by a color acquisition device.

For a better understanding, the current image is identified as image N, and the next image is identified as image N+1.

Figure 4:
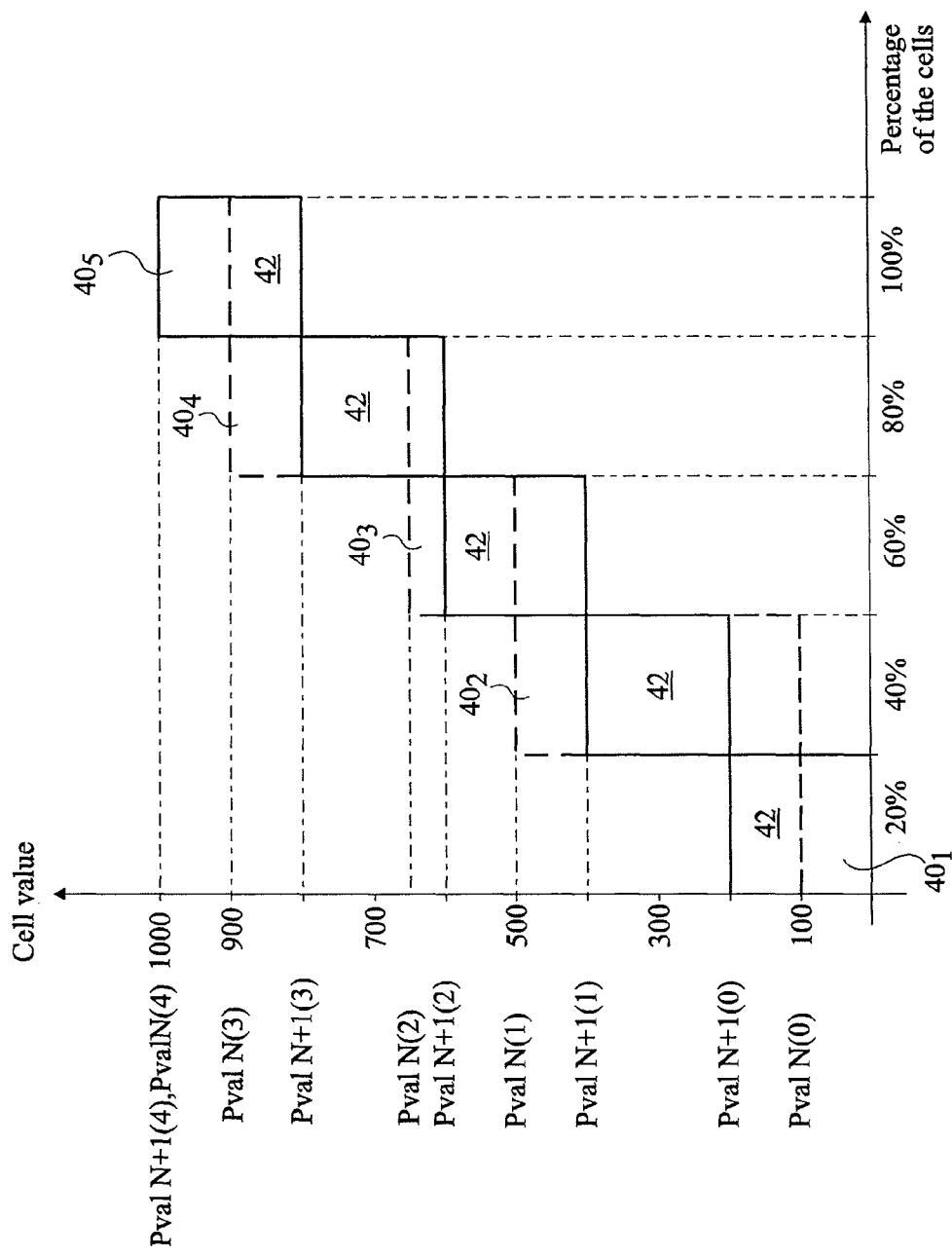
FIG. 4 illustrates the cell value distributions for the current image and the desired distribution of the cell values for the next image.

FIG. 4 shows the analysis performed by electronic circuit 14 (FIG. 1) of control and processing of an image N to prepare the capture of image N+1 according to an embodiment of the control method.

Figure 5:
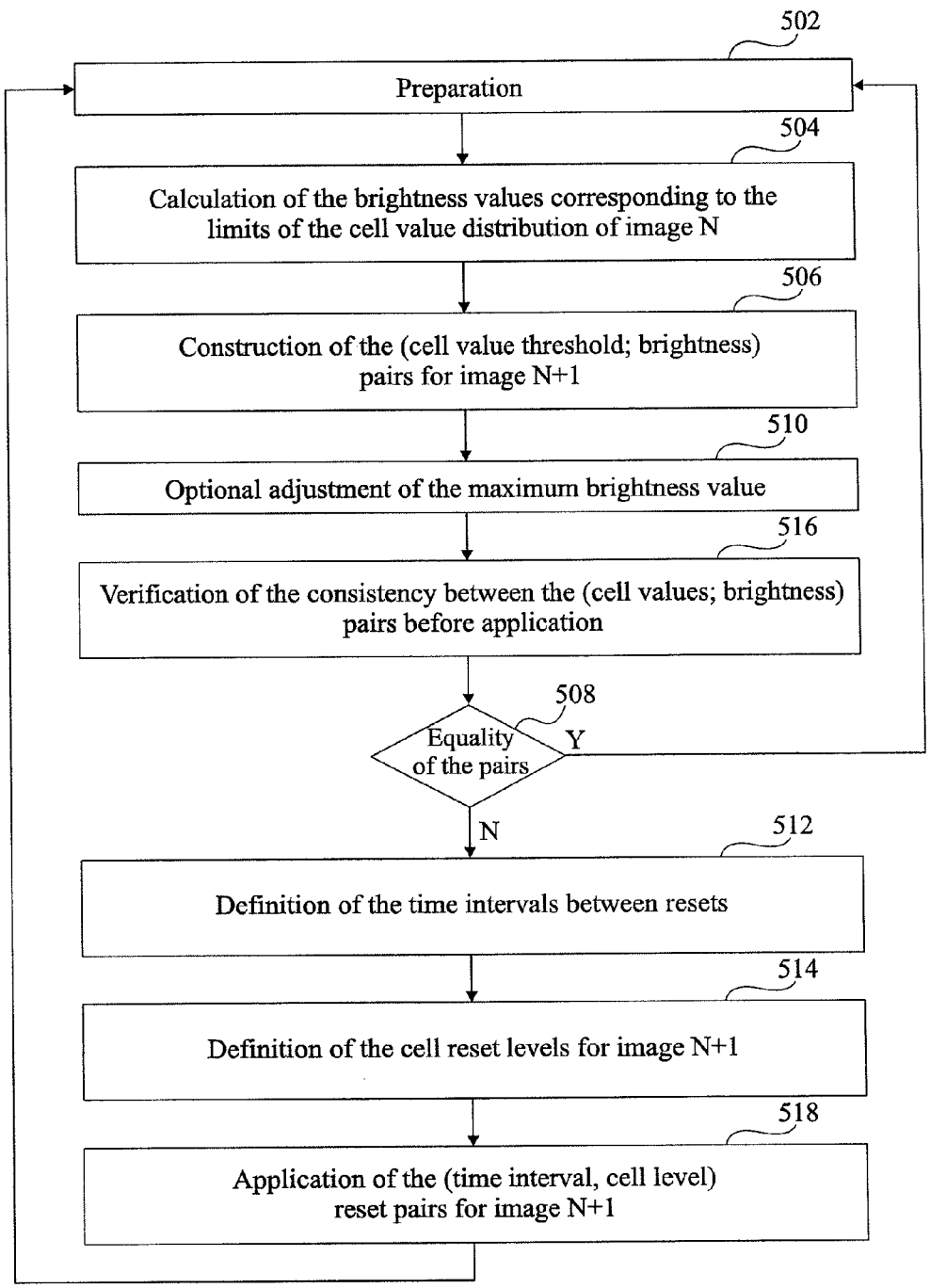
FIG. 5 illustrates, in the form of a timing diagram, the operation of a cell of an image sensor according to an embodiment of the present invention.

FIG. 5 shows an example of a timing diagram describing an embodiment of the chain of sequences executed by circuit 14.

The sequences of FIG. 5 are preceded by a sequence of initialization of electronic control and processing circuit 14 during which at least the following intrinsic values are stored:

data representative of the sensitivity of a cell, for example, arbitrarily:

Sen=1,000 CV/lux.s, where CV designates the value of the cell corresponding to the light received from the photodiode;

the number of intervals into which the entire excursion of the cell values is desired to be divided (for example, five intervals); and optionally, the saturation threshold of the sensor.

The analysis starts with a preparation sequence 502 during which the next values necessary to future calculations are calculated and stored:

the maximum value (1,000) provided by the cells of image N;

the distribution of the number of cells in image N. In the example of FIG. 4, the cells are unevenly distributed into 5 intervals, or level ranges, 40 ($40_1$, $40_2$, $40_3$, $40_4$, $40_5$) shown in dotted lines with upper thresholds $PvalN_{(i)}$, with i designating the rank of the interval in the image (in this example, $0 \leq i \leq 4$):

$PvalN_{(0)}$=100;
$PvalN_{(1)}$=500;
$PvalN_{(2)}$=650;
$PvalN_{(3)}$=900; and
$PvalN_{(4)}$=1,000.

the brightness values $LvalN_{(i)}$ corresponding to the thresholds of the intervals of distribution in image N, for example:

$LvalN_{(0)}$=10;
$LvalN_{(1)}$=30;
$LvalN_{(2)}$=80;
$LvalN_{(3)}$=200; and
$LvalN_{(4)}$=500.

the desired distribution for the cell values of image N+1 by division of the maximum brightness value of image N by the number of intervals, to obtain upper thresholds $PvalN+1_{(i)}$ of the intervals for image N+1.

The example of FIG. 4 relates to the distribution of the cell values into five intervals 42, each gathering 20% of the cell values:

$PvalN+1_{(0)}$=200;
$PvalN+1_{(1)}$=400;
$PvalN+1_{(2)}$=600;
$PvalN+1_{(3)}$=800; and
$PvalN+1_{(4)}$=1,000.

The number of intervals may be adapted from one image to the other by redistributing the values over the aimed number of intervals.

Then, a first calculation sequence 504 in which the brightness values corresponding to the limits of the cell distribution of image N for each interval are determined is executed.

Based on the data of image N, the brightness values $LvalN+1_{(i)}$ corresponding to each threshold of the value intervals are calculated by means of the following formula:

$$LvalN_{(i)} + \left(\frac{LvalN_{(i+1)} - LvalN_{(i)}}{PvalN+1_{(i+1)} - PvalN+1_{(i)}}\right) * (PvalN_{(i)} - PvalN+1_{(i)}),$$

where Lval designates the brightness values.

To apply the above formula, it should be noted that $PvalN+1_{(0)} = LvalN_{(0)} = 0$, independently from the previously-obtained values.

In the example of FIG. 4, the following values are obtained:
$LvalN+1_{(0)} = 5$;
$LvalN+1_{(1)} = 55$;
$LvalN+1_{(2)} = 110$;
$LvalN+1_{(3)} = 350$; and
$LvalN+1_{(4)} = 500$.

A second calculation sequence 506 associates the values determined in the first sequence in pairs (cell value thresholds; brightness) for image N+1, or $(LvalN+1_{(i)}; PvalN+1_{(i)})$.

In the example of FIG. 4, the following values are obtained:
i=0: (200; 5);
i=1: (400; 55);
i=2: (600; 110);
i=3: (800; 350); and
i=4: (1,000; 500).

Optionally, the maximum brightness level is adapted before the determination of the time intervals and of the reset levels. For this purpose, a third calculation sequence 510 adjusts the maximum brightness value to take advantage of the entire available excursion of brightness levels. The number of saturated cells of image N is calculated and compared with a saturation threshold set for the sensor.

If the calculated number is greater than the saturation threshold, image N is said to be overexposed. The value assigned to the maximum brightness of image N+1 is then decreased by an appropriate value.

If the calculated number is smaller than the saturation threshold, image N is said to be underexposed. The value assigned to the maximum brightness for image N+1 is then increased up to the highest brightness value of image N.

A fourth calculation sequence 516 verifies the consistency before application of the (cell values; brightness) pairs on image N+1. For this purpose, slope $a_i$ of the respective segments defined by pairs $(LvalN+1_{(last\_valid\_point)}; PvalN+1_{(last\_valid\_point)})$ and $(LvalN+1_{(i)}; PvalN+1_{(i)})$, where last_valid_point designates the last validated point. For i=0, $LvalN+1_{(last\_valid\_point)} = 0$ and $PvalN+1_{(last\_valid\_point)} = 0$ is calculated.

This value is compared with slopes $\alpha_n$ of the segments defined by pairs $(LvalN+1_{(last\_valid\_point)}; PvalN+1_{(last\_valid\_point)})$ and $(LvalN+1_{(n)}; PvalN+1_{(n)})$, where n ranges between i+1 and "number of intervals"−1 (here, 4). If a slope $\alpha(i)_n$ is greater than slope $a_{(i)}$ of the segment, then pair $(LvalN+1_{(i)}; PvalN+1_{(i)})$ is not taken into account for the application of the values to the sensor. If, conversely, $a_{(i)}$ is greater than all values $\alpha(i)_n$, then the point is valid and last_valid_point=i is defined.

The slope of each segment is calculated as follows:

$$a_{(i)} = \frac{LvalN+1_{(i)} - LvalN+1_{(last\_valid\_point)}}{PvalN+1_{(i)} - PvalN+1_{(last\_valid\_point)}},$$

by taking $LvalN+1_{(-1)} = PvalN+1_{(-1)} = 0$.

With the values taken in the above example, the segments have decreasing slopes and all pairs are kept:
$a_{(0)} = 40.00$ and $\alpha(0)_1 = 7.27$; $\alpha(0)_2 = 5.45$; $\alpha(0)_3 = 2.29$; $\alpha(0)_4 = 2.00$: the point is valid.
$a_{(1)} = 4$ and $\alpha(1)_2 = 3.81$; $\alpha(1)_3 = 1.74$; $\alpha(1)_4 = 1.35$: the point is valid.
$a_{(2)} = 3.63$ and $\alpha(2)_3 = 1.36$; $\alpha(2)_4 = 1.35$: the point is valid.
$a_{(3)} = 0.83$ and $\alpha(3)_4 = 1.03$: the point is valid.
$a_{(4)} = 1.03$.

The pair corresponding to i=3 is thus eliminated and, in the example of FIG. 4, the following is obtained:
i=0: (200; 5);
i=1: (400; 55);
i=2: (600; 110); and
i=3: (1,000; 500).

If the pairs obtained for image N+1 are identical to the pairs of image N, these new pairs are not applied, as illustrated at 508. It is then directly returned to preparation sequence 502. Otherwise, it is proceeded to the next sequence.

A fifth calculation sequence 512 defines time intervals $T_{(i)}$ of exposure between resets for image N+1 by means of formula:

$$T_{(i)} = \frac{PvalN+1_{(i)} - PvalN+1_{(i-1)}}{Sen \cdot (LvalN+1_{(i)} - LvalN+1_{(i-1)})}.$$

The preceding example provides:
$T_{(0)} = 40$ ms;
$T_{(1)} = 4$ ms;
$T_{(2)} = 3.64$ ms; and
$T_{(3)} = 1.03$ ms.

A sixth calculation sequence 514 defines levels $Prst_{(i)}$ of the successive resets for image N+1 with formula:

$$Prst_\omega = PvalN+1_\omega - (T_\omega \cdot Sen \cdot LvalN+1_\omega).$$

The preceding example provides:
$Prst_{(0)} = 0$;
$Prst_{(1)} = 180$;
$Prst_{(2)} = 200$; and
$Prst_{(3)} = 487$.

Figure 2:
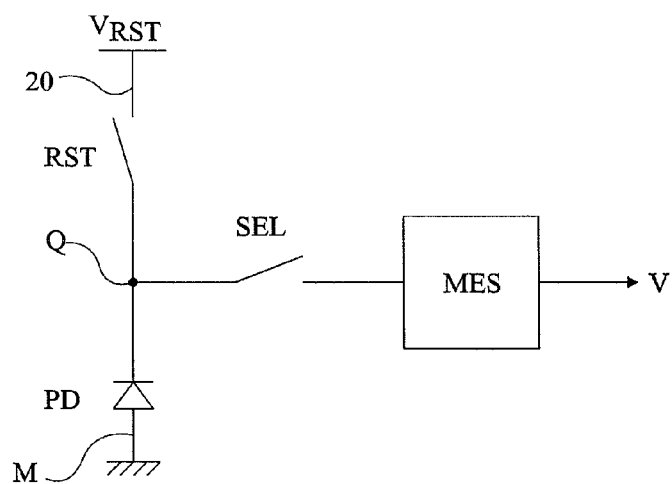
FIG. 2, previously described, shows a first conventional example of an image sensor cell.
Figure 3:
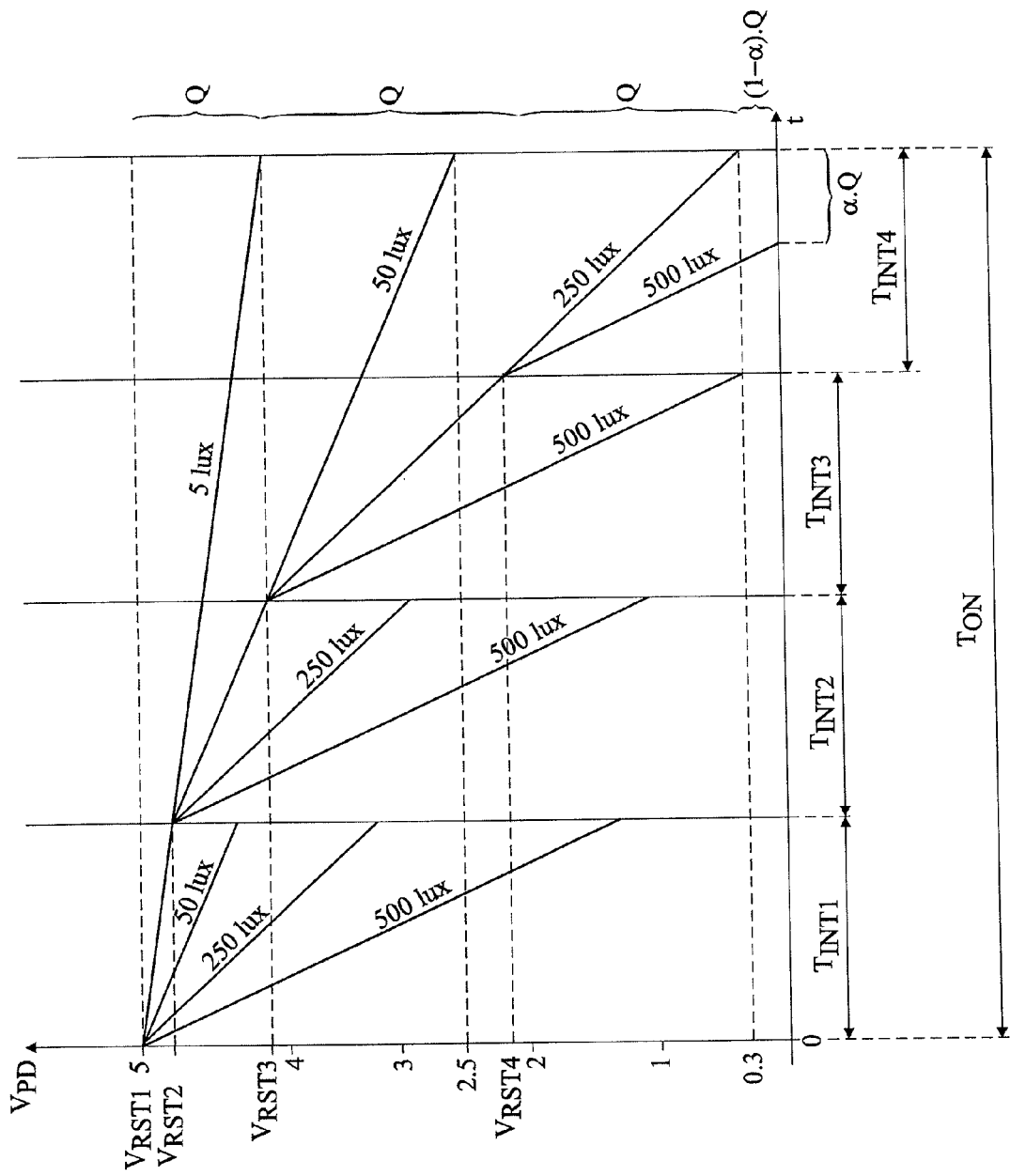
FIG. 3, previously described, is a timing diagram illustrating the operation of a dynamic sensor cell and the cell saturation phenomenon.

The levels are converted into cell reset voltage $V_{RST}$ (FIG. 2).

A seventh sequence 518 applies the (time interval between resets; reset cell level) pairs to all the sensor cells for the capture of image N+1, before returning to the sequence of preparation of image N+2.

An advantage of the described embodiment is that it avoids the light saturation of the cells by calculating, from the current image, the (time interval; cell level) reset pairs to be applied to the next image N+2.

Another advantage of the described embodiment is that it improves the use of the entire light excursion of the sensor.

Of course, the present invention is likely to have various alterations, modifications and improvements which will readily occur to those skilled in the art, in particular the adapting of the calculated values into voltage levels adapted to the cells, which is within the abilities of those skilled in the art. Further, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling a dynamic image sensor comprising photodiode cells, each providing an information representative of a brightness level, comprising for each image the steps of:
    defining ranges of brightness levels;
    defining several successive time intervals of exposure of the cells for the next image, the cells being reset at the beginning of each interval, said intervals being calculated from the brightness levels of a present image and from the desired brightness level distribution for the next image; and
    adapting the time intervals of exposure as a function of a homogeneous distribution of the number of cells in the ranges of brightness levels, wherein the time intervals $T_{(i)}$ between resets for the next image are calculated by the following formula:

$$T_{(i)} = \frac{PvalN + 1_{(i)} - PvalN + 1_{(i-1)}}{Sen \cdot (LvalN + 1_{(i)} - LvalN + 1_{(i-1)})},$$

where
$PvalN+1_{(i)}$ designates the upper threshold of interval i for the next image,
$PvalN+1_{(i-1)}$ designates the upper threshold of interval i−1 for the next image,
$LvalN+1_{(i)}$ designates the brightness value of interval i for the next image,
$LvalN+1_{(i-1)}$ designates the brightness value of interval i−1 for the next image, and
Sen designates the sensitivity of a cell.

2. The method of claim 1, wherein the time intervals of exposure of a current image are used to determine those of a next image.

3. The method of claim 1, wherein the cell reset levels are calculated from the upper thresholds of the brightness intervals, the time intervals, the brightness values, and the sensitivity of a cell.

4. The method of claim 3, wherein levels $Prst_{(i)}$ of the successive resets for the next image are calculated by the formula:

$$Prst_{(i)} = PvalN+1_{(i)} - (T_{(i)} \cdot Sen \cdot LvalN+1_{(i)}), \text{ where}$$

$T_{(i)}$ designates the exposure time interval of rank i between resets for the current image.

5. The method of claim 1, further comprising a step of verification that the successive reset levels are decreasing.

6. The method of claim 1, wherein a maximum brightness value of the cells of the current image is, optionally, compared with a threshold and adjusted, for the next image, to provide the cell distribution over the entire range of available values.

7. A circuit for controlling an image sensor capable of implementing the method of claim 1.

8. An image sensor comprising the circuit of claim 7.

9. A method for controlling an image sensor including sensor cells, comprising:
    determining, by an image sensor control circuit, brightness values of a next image corresponding to limits of a desired cell value distribution, based on values of a current image; and
    determining, by the image sensor control circuit, time intervals between resets of the sensor cells and corresponding cell reset values for the next image, based on the determined brightness values and the limits of the desired cell value distribution of the next image, wherein the time intervals between resets of the sensor cells are adjusted to achieve the desired cell value distribution of the next image, wherein the time intervals $T_{(i)}$ between resets for the next image are calculated by the following formula:

$$T_{(i)} = \frac{PvalN + 1_{(i)} - PvalN + 1_{(i-1)}}{Sen \cdot (LvalN + 1_{(i)} - LvalN + 1_{(i-1)})},$$

where
$PvalN+1_{(i)}$ designates an upper threshold of interval i for the next image,
$PvalN+1_{(i-1)}$ designates an upper threshold of interval i−1 for the next image,
$LvalN+1_{(i)}$ designates a brightness value of interval i for the next image,
$LvalN+1_{(i-1)}$ designates a brightness value of interval i−1 for the next image, and
Sen designates the sensitivity of a cell.

10. A method for controlling an image sensor as defined in claim 9, further comprising applying the determined time intervals and the corresponding cell reset values to the sensor cells for acquiring the next image.

11. A method for controlling an image sensor as defined in claim 9, further comprising comparing a number of saturated sensor cells of the current image with a saturation threshold for the image sensor and adjusting a maximum brightness value based on a result of the comparison.

12. A method for controlling an image sensor as defined in claim 9, wherein determining brightness values of a next image includes construction of (cell value threshold; brightness) pairs for the next image.

13. A method for controlling an image sensor as defined in claim 9, further comprising verifying that successive cell reset values are decreasing.

14. A method for controlling an image sensor as defined in claim 9, wherein the cell reset values are calculated from upper thresholds of the intervals, the time intervals, the brightness values, and the sensitivity of a cell.

15. A method for controlling an image sensor including sensor cells, comprising:
    determining, by an image sensor control circuit, brightness values of a next image corresponding to limits of a desired cell value distribution, based on values of a current image; and
    determining, by the image sensor control circuit, time intervals between resets of the sensor cells and corresponding cell reset values for the next image, based on the determined brightness values and the limits of the desired cell value distribution of the next image, wherein the time intervals between resets of the sensor cells are adjusted to achieve the desired cell value distribution of the next image, wherein levels $Prst_{(i)}$ of the successive resets for the next image are calculated by the following formula:

$$Prst_{(i)} = PvalN+1_{(i)} - (T_{(i)} \cdot Sen \cdot LvalN+1_{(i)}), \text{ where}$$

$T_{(i)}$ designates the exposure time interval of rank i between resets for the current image, PvalN+1$_{(i)}$ designates an upper threshold of interval i for the next image, LvalN+1$_{(i)}$ designates a brightness value of interval i for the next image, and Sen designates the sensitivity of a cell.

16. An image acquisition device comprising an image sensor including sensor cells and a control and processing circuit encoded with instructions that, when executed, are configured to:

determine brightness values of a next image corresponding to limits of a desired cell value distribution, based on values of a current image; and determine time intervals between resets of the sensor cells and corresponding cell reset values for the next image, based on the determined brightness values and the limits of the desired cell value distribution of the next image, wherein the time intervals between resets of the sensor cells are adjusted to achieve the desired cell value distribution of the next image, wherein the time intervals $T_{(i)}$ between resets for the next image are calculated by the following formula:

$$T_{(i)} = \frac{PvalN+1_{(i)} - PvalN+1_{(i-1)}}{Sen \cdot (LvalN+1_{(i)} - LvalN+1_{(i-1)})},$$

where

PvalN+1$_{(i)}$ designates an upper threshold of interval i for the next image,

PvalN+1$_{(i-1)}$ designates an upper threshold of interval i−1 for the next image, LvalN+1$_{(i)}$ designates a brightness value of interval i for the next image, LvalN+1$_{(i-1)}$ designates a brightness value of interval i−1 for the next image, and Sen designates the sensitivity of a cell.

17. An image acquisition device comprising an image sensor including sensor cells and a control and processing circuit encoded with instructions that, when executed, are configured to:

determine brightness values of a next image corresponding to limits of a desired cell value distribution, based on values of a current image; and determine time intervals between resets of the sensor cells and corresponding cell reset values for the next image, based on the determined brightness values and the limits of the desired cell value distribution of the next image, wherein the time intervals between resets of the sensor cells are adjusted to achieve the desired cell value distribution of the next image, wherein levels Prst$_{(i)}$ of the successive resets for the next image are calculated by the following formula:

$$Prst_{(i)} = PvalN+1_{(i)} - (T_{(i)} \cdot Sen \cdot LvalN+1_{(i)}), \text{ where}$$

$T_{(i)}$ designates the exposure time interval of rank i between resets for the current image, PvalN+1$_{(i)}$ designates an upper threshold of interval i for the next image, LvalN+1$_{(i)}$ designates a brightness value of interval i for the next image, and Sen designates the sensitivity of a cell.

* * * * *